UNITED STATES PATENT OFFICE.

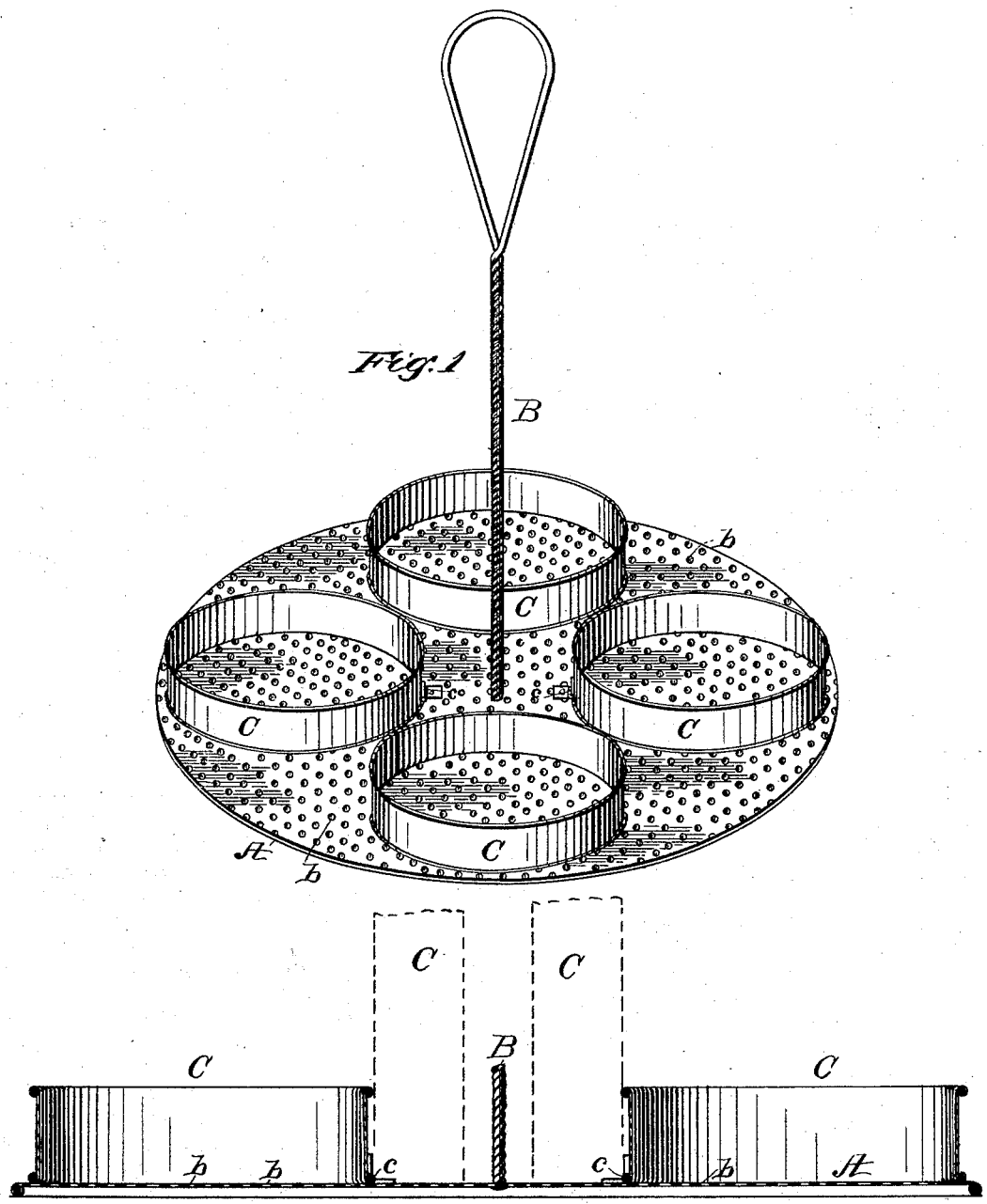

CLARA T. GOTT, OF SEATTLE, WASHINGTON.

EGG-POACHER.

SPECIFICATION forming part of Letters Patent No. 495,796, dated April 18, 1893.

Application filed December 9, 1892. Serial No. 454,598. (No model.)

*To all whom it may concern:*

Be it known that I, CLARA T. GOTT, of Seattle, in the county of King and State of Washington, have invented a new and Improved Egg-Poacher, of which the following is a full, clear, and exact description.

This invention consists in a culinary article of novel construction for poaching eggs, substantially as hereinafter described and pointed out in the claim, whereby great convenience and many advantages are secured over or compared with the means ordinarily employed for thus cooking eggs.

Reference is to be had to the accompanying drawings forming a part of this specification, in which similar letters of reference indicate corresponding parts in both the figures.

Figure 1 represents a view in perspective of my newly invented egg poacher; and Fig. 2 is a vertical section of the same, in part.

A in the drawings indicates a flat tin plate having a series of fine perforations $b$ in or through it. This plate, the edge of which is preferably wired and smoothly finished without however marring the flatness of the dish or plate, may be of any convenient size, according to the number of eggs it is adapted to poach at one and the same time. In the center of said plate is an upwardly projecting handle B which may be made of twisted wire. Suitably spaced around this handle B and hinged as at $c$, to the upper surface of the plate, in vicinity to the handle are a series of rings C, here shown as four, which may also be made of tin or tinned metal wired and smoothly finished on their opposite edges and adapted to lie flat down on the metal plate and to be thrown up or back, as required, by their hinged connection with the plate, against or toward the handle B, as shown by dotted lines in Fig. 2. These rings are each of a suitable diameter and proper depth to contain an egg broken or run from its shell, to be poached within them. Being hinged to the plate said rings are held in place while placing and poaching the eggs within them, and are readily turned back against the handle while the poached eggs are being removed.

When using this egg poacher, it is placed by its upright handle in a pot-like dish, basin or frying pan containing boiling water, and the eggs or contents of their shells dropped into the rings C while lying flat on the plate A and which fit close to the plate while the eggs are being cooked. As soon as the eggs are cooked, the poacher is as readily lifted by its upright and central handle out of the boiling water, which latter or so much of it as remains on the plate A is drained through the perforations $b$. The rings C, one at a time are then turned, on their hinges, back against the handle B, and the poached eggs easily and neatly slipped off the flat plate A onto the toast or platter on which they are to be served.

By means of this poacher the process of poaching eggs will be greatly facilitated and quickened, and the eggs be much more easily removed without risk of breaking them from the flat plate, than from a hollow chamber or receptacle or than by the old awkward way in which loose muffin rings are used in the frying pan and the poached eggs removed by a spade-like lifter.

Having thus fully described my invention, I claim as new and desire to secure by Letters Patent—

An egg poacher comprising a foraminated plate A, provided with a central vertical handle B, a series of disconnected rings C resting upon the plate and separately and independently hinged thereto at their inner sides; whereby any one of the rings may be swung up to remove an egg without releasing the contents of the other rings, substantially as set forth.

CLARA T. GOTT.

Witnesses:
DAVID GILMORE,
AGNES GILMORE.